B. B. & J. W. SPRATLIN.
RECORDER FOR SAWMILLS.
APPLICATION FILED APR. 27, 1911.
1,057,679.
Patented Apr. 1, 1913
4 SHEETS—SHEET 1.
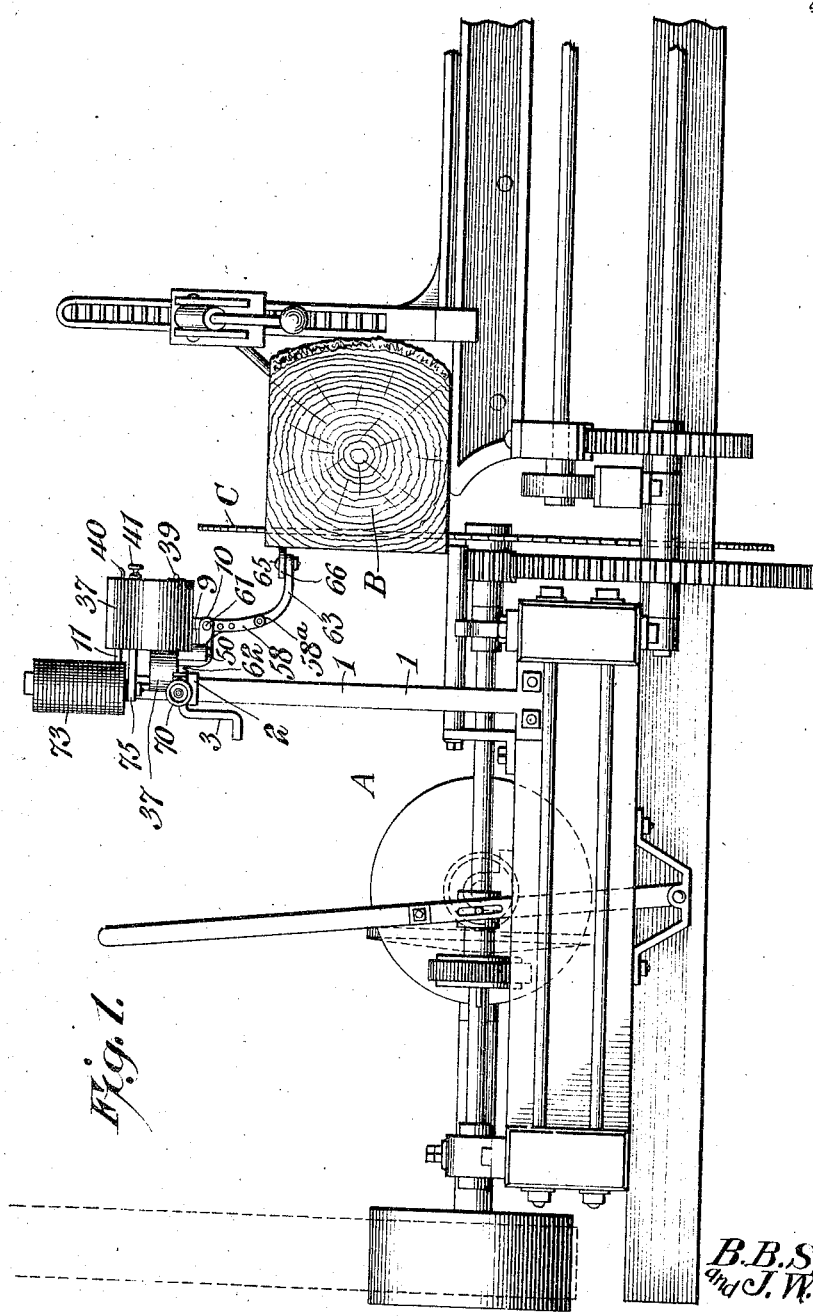
Witnesses
Howard D. Orr.
F. T. Chapman
B. B. Spratlin
and J. W. Spratlin,
Inventors,
By E. G. Siggers
Attorney

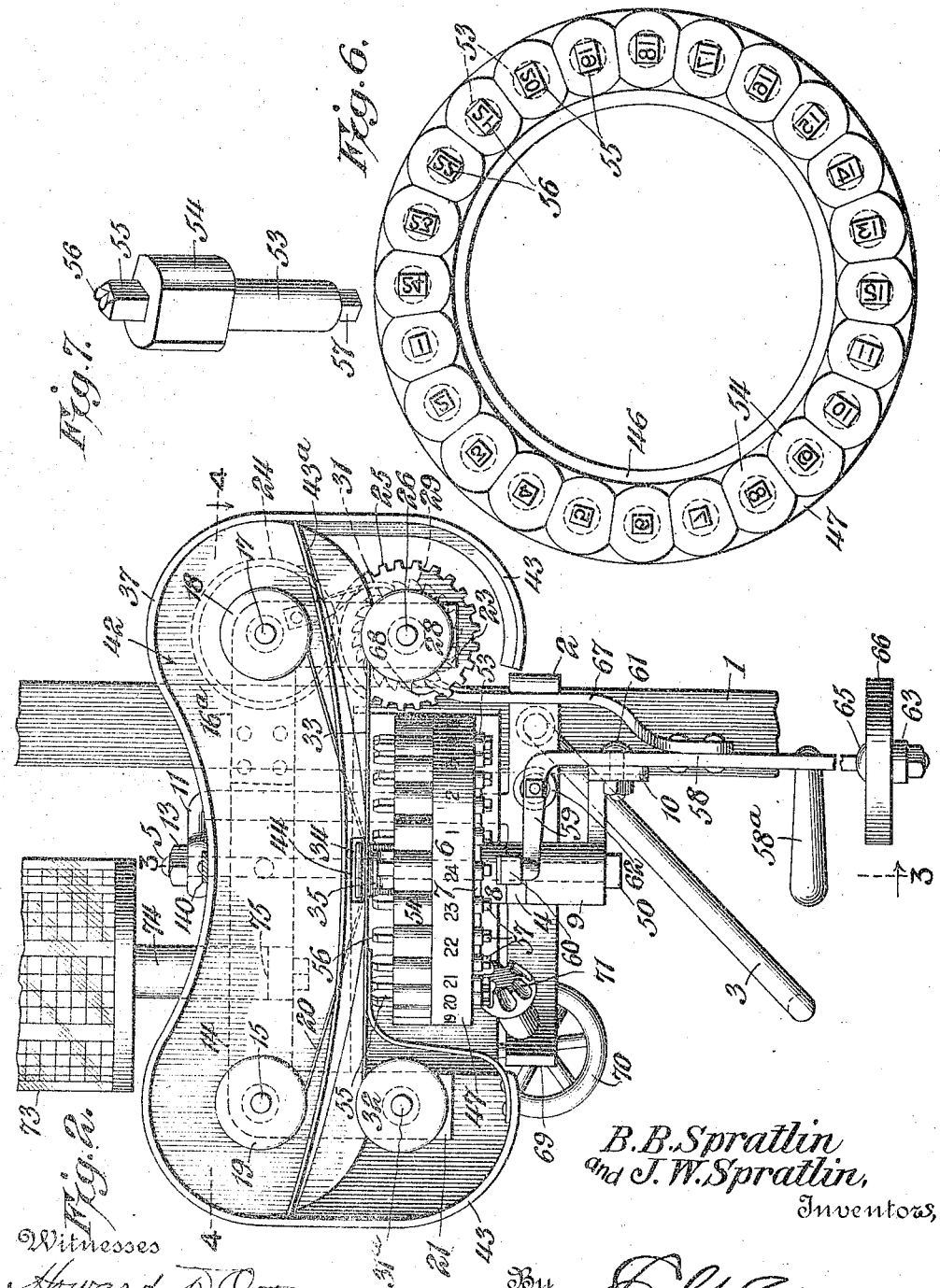

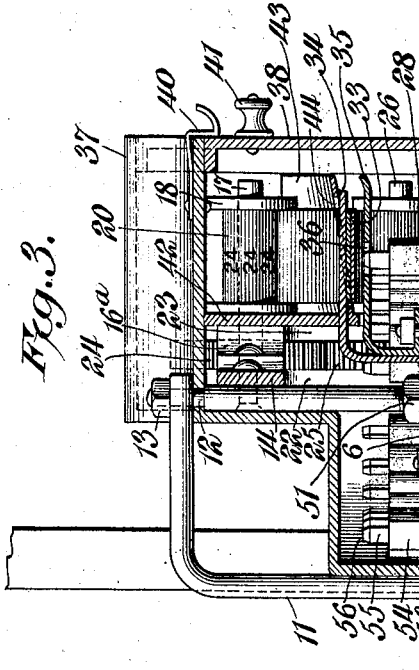

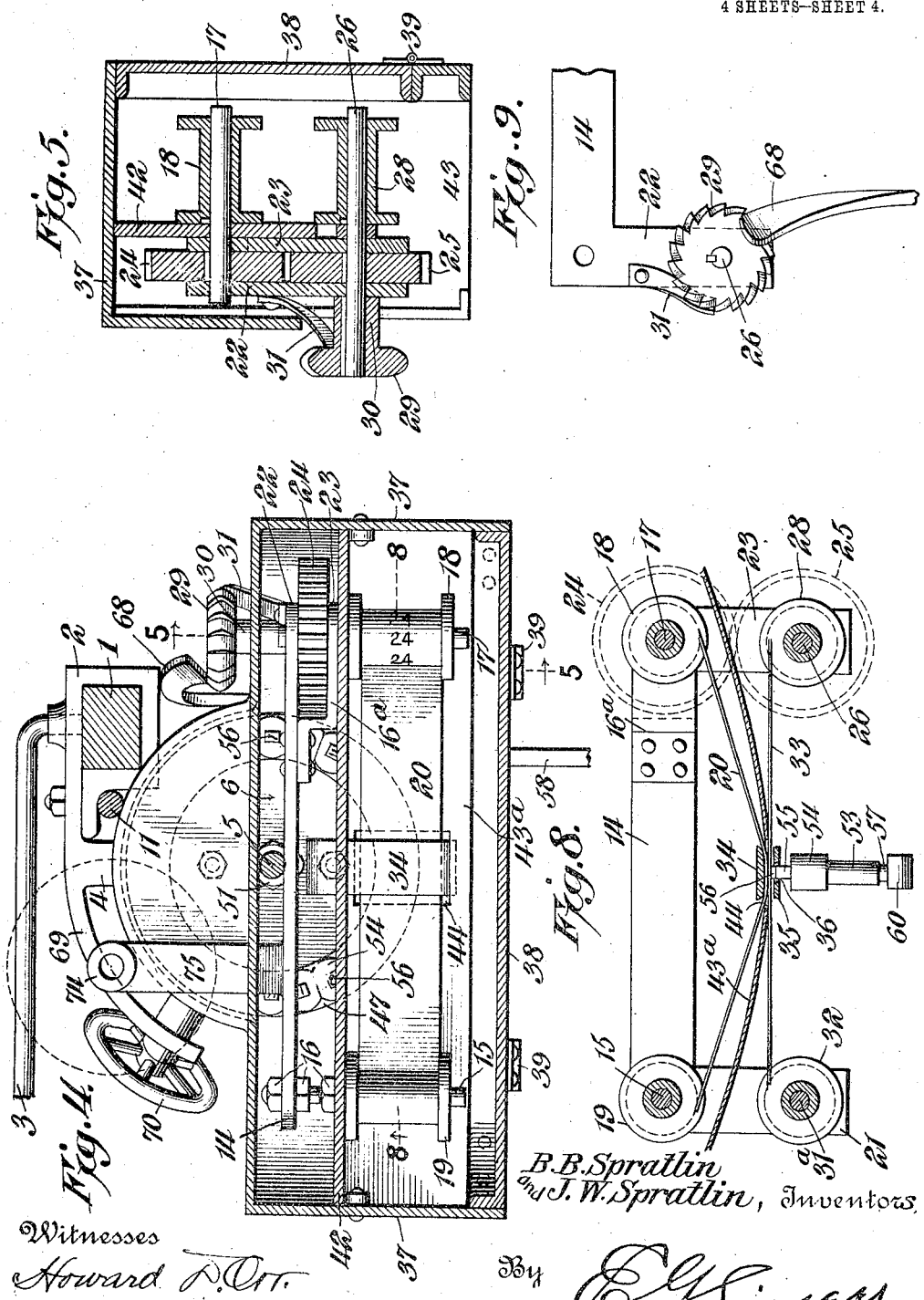

UNITED STATES PATENT OFFICE.

BENJAMIN BARROW SPRATLIN AND JAMES WILL SPRATLIN, OF HULL, GEORGIA, ASSIGNORS OF ONE-THIRD TO BENJAMIN HENRY BARROW, OF ATHENS, GEORGIA.

RECORDER FOR SAWMILLS.

1,057,679.  Specification of Letters Patent.  Patented Apr. 1, 1913.

Application filed April 27, 1911. Serial No. 623,720.

*To all whom it may concern:*

Be it known that we, BENJAMIN B. SPRATLIN and JAMES W. SPRATLIN, citizens of the United States, residing at Hull, in the county of Madison and State of Georgia, have invented a new and useful Recorder for Sawmills, of which the following is a specification.

This invention has reference to improvements in recorders for sawmills, and is designed to provide a recorder which will record each board cut and may be set so that each separate record will designate the board feet of each board cut.

The present invention is an attachment for sawmills requiring no change in the working parts of the mill, and is so constructed that the board being cut will cause the actuation of the recorder irrespective of the length of the board, and as all the boards cut from a single log are of the same length, the recorder is caused to operate by each board cut to make a record of the particular number of boards of the particular length cut from the log. On the placing of another log in the mill, the recorder may be set to record the number of boards cut from the second log, assuming that the second log is of a different length than the first log, and the operation may be continued indefinitely. The recorder can be set to print numbers corresponding to the number of feet in length of the boards and each imprint will represent a single board of the imprinted number of feet in length, so that the number of boards and the number of feet in length of each board is readily ascertained by an examination of the recorder strip, the imprints being made in a single line upon a narrow band of suitable material, such as paper. The recorder may equally as well be used for designating the number of board feet in the board by each imprint, and then by ascertaining the number of boards cut, the total number of board feet is readily calculated. The recorder is, also, capable of indicating the lumber by other designations as it is cut up into lengths of suitable thickness and width.

The invention will be best understood from a consideration of the following detailed description taken in connection with the accompanying drawings forming a part of this specification, with the understanding, however, that while the structure illustrated in the drawings is a practical embodiment of the invention, the latter is susceptible of various modifications and changes without material departure from the scope of the invention.

In the drawings:—Figure 1 is an end elevation of a sawmill with the recorder of the present invention attached thereto. Fig. 2 is an elevation of the recorder on a larger scale than Fig. 1 and detached from the sawmill, the front of the recorder being removed to expose the interior thereof. Fig. 3 is a section on the line 3—3 of Fig. 2. Fig. 4 is a section on the line 4—4 of Fig. 2. Fig. 5 is a section on the line 5—5 of Fig. 4. Fig. 6 is a plan view of the type wheel or annulus. Fig. 7 is a perspective view of one of the type. Fig. 8 is a section on the line 8—8 of Fig. 4 with parts omitted. Fig. 9 is a detail elevation of a ratchet wheel whereby the imprint receiving strip and the ink ribbon are propelled. Fig. 10 is a view of a portion of the structure shown in Fig. 3 showing some parts in a different operative position than Fig. 3. Fig. 11 is a displayed view of a reference sheet used in connection with the register.

Referring to the drawings, there is shown a sawmill A which may be of any of the usual types, and since the structure of the sawmill does not enter into the present invention, no detailed description of such mill is herein given. In connection with the showing of Fig. 1 there is indicated a log B properly lodged on the mill for being divided by a circular saw C, forming part of the mill, into boards or other form of lumber of appropriate width and thickness.

The recorder is supported on a base or standard 1 made fast to an appropriate portion of the sawmill, and surrounding this post is a clip 2 having at one point a threaded passage for the threaded end of a crank 3, by means of which the clip 2 may be fastened at any point along the post 1. The crank 3 is provided for ease of manipulation, and is in this respect superior to a thumb screw for the same purpose. Fast to the clip 2 is a bracket 4 carrying at the end remote from the clip a post or stem 5, which, in the ordinary position of the recorder, is substantially upright. The post 5 above the bracket 4 carries a disk 6, between which latter and the bracket 4 there is interposed another disk 7 provided with a hub 8 whereby the disk 7 is spaced from the bracket. On the side of the bracket 4 remote from the hub 8 there is another hub or block 9 having projecting therefrom an arm 10.

Secured at one end to the bracket 4 near its point of connection with the clip 2 is a brace 11, in part substantially parallel with the post 5, and then bent and extending to the latter, and the post 5 is reduced at the corresponding end, as indicated at 12, and there traverses the brace and is secured thereto by a nut 13.

Secured to the post 5 near the reduced end 12 thereof, is a bar 14 extending in opposite directions from the post to about the same distance on each side of the post, and at one end of this bar there is secured a pin 15 substantially perpendicular to the bar by nuts 16 or in any other appropriate manner. The other end of the bar 14 has an angle member 16$^a$ attached thereto in substantially parallel relation to the corresponding end of the bar, and journaled in the angle member 16$^a$ and the end of the bar adjacent thereto is a shaft 17.

On the shaft 17 is a spool or drum 18, and on the pin 15 is a similar drum 19. The drum 18 is keyed or otherwise secured to the shaft 17, so as to turn therewith, but at the same time may be removed from the shaft at will. The drum or spool 19 may turn upon the pin 15 and may be removed therefrom at will, but the drum 19 can turn upon the pin 15 only by reason of the exertion of some little force. The two drums 18 and 19 are designed to carry a strip 20 of paper or other suitable record receiving material for a purpose which will appear hereinafter.

The bar 14 is provided with terminal angle extensions 21, 22, respectively, and the angle member 16$^a$ is provided with a terminal angle extension 23 similar to the extension 22 of the bar 14. The shaft 17 carries a gear wheel 24 keyed or otherwise secured thereto, and this gear wheel is in mesh with another gear wheel 25 keyed or otherwise secured to a shaft 26 journaled in the extensions 22 and 23 near the free ends thereof, the gear wheel 24 being lodged between the bar 14 and the angle member 16$^a$, and the gear wheel 25 being lodged between the extensions 22 and 23. The shaft 26 is in parallel relation to the shaft 17 and carries a drum or spool 28 keyed or otherwise held to the shaft to rotate therewith, but removable from the shaft lengthwise of the latter. The shaft 26 extends beyond the angle member 22 for an appropriate distance and there carries a ratchet wheel 29 provided with a spring hub 30 designed to maintain the ratchet wheel at an appropriate distance from the extension 22. This ratchet wheel is constrained to move in one direction only by a back stop pawl 31 fast to the extension 22.

The angle extension 21 carries a pin 31$^a$ in parallel relation to the pin 15, and this pin 31$^a$ carries a spool or drum 32 matching the drum 19. The spools 28 and 32 are designed to carry an ink ribbon 33 in such position as to act upon the paper strip 20 under conditions to be described.

Fast to the disk 6 is a guiding finger 34 having its opposite edges rounded and designed to override the paper strip 20 and to operate as a fixed platen. The disk 6 also carries another finger 35 in underriding spaced relation to the finger 34 and provided at a suitable point with a perforation or passage 36 in position to match the ribbon 33 and paper strip 20 which are conducted between the fingers 34 and 35.

The elements so far described are in part protected by an inclosing casing 37 traversed and secured by the reduced portion 12 of the stem 5, and, also, by other parts of the frame of the recorder. This casing is provided at what may be termed the front with a door 38 secured at one edge to the casing by hinges 39, and at the other edge by a latch 40, the hinges 39 supporting the door at what may be termed the lower edge of the door when the device is in operative position, and the latch 40 engaging what may be termed the upper edge of the door. An appropriate knob 41 provides for the manipulation of the door when such is desirable. Within the casing there is a wall 42 between the spools or drums 18 and 19 and the bar 14, while the casing is formed with drop portions 43 lodging the drums 28 and 32. The door 38 is so located as to give access to the several drums and may in part inclose certain other portions of the structure to be described. To prevent accidental contact of the paper band 20 with the ribbon 33, the casing is provided with a web or wall 43$^a$ extending between the band and ribbon and provided with an opening 44 coincident with the platen or finger 34 and the finger 35.

The disk 6 is provided on what may be termed its under side with a rabbet 45 and the edge of the disk 7 underrides this rabbeted portion of the disk 6 so that the disks 6 and 7 provide a peripheral groove between them in which is lodged an inwardly directed annular tongue 46 formed on one edge of a ring or annulus 47, which latter is of about the same thickness as the disk 6 and is held to the disk 6 by the disk 7 engaging the tongue 46, but may be rotated with relation to the disk 6 without interference by either the disk 6 or disk 7. The disk 6 and disk 7 are connected together by bolts 49 or otherwise, and one of these bolts 49 may be utilized for securing the fingers 34 and 35 to the disk 6. The parts are, moreover, further held together by the stem 5, which is provided at what may be termed its lower end with a head 50 and is threaded and provided with a nut 51 in position to engage the disk 6 on what may be termed its upper face. The annulus 47 is provided with a circular series of holes or passages 52 in parallel relation to the axis of rotation of the ring or annulus 47, and extending through each passage 52 is a stem 53 formed near one end with a segmental enlargement 54 beyond which, in line with the axis of the stem 53, there is an extension 55 constituting a type having its free end formed with an imprinting member 56 which in the particular arrangement shown is shaped to produce the imprint of a number. The stem 53 at the end remote from the enlargement 54, is formed with an axial projection 57, which may be made of a material such as hardened steel capable of withstanding numerous blows, and the type extension 55 may, also, be made of a material to withstand blows. While the type member made up of the stem 53 and body 54 and other parts carried by these members may be made all in one piece, it is not mandatory that such should be the case, for the extension 57 and type member 55 may be made in one continuous piece extending axially through the stem 53 and body portion 54. The type members are arranged in a circular series and carried by the ring 47 with the body portions 54 abutting, the said abutting portions being in radial relation to the axis of the ring 47. The body portions 54, as well as the stems 53, serve to guide the type members when they are moved longitudinally, as will hereinafter appear, in the ring 47. The type 56 are preferably arranged to present consecutive numbers, but this is not at all mandatory and any arrangement of imprinting members may be provided. The visible edge of the ring 47 is provided with like indications, so that an operator may readily ascertain which type is in proper relation to the passage 36, the imprinting ends of the type members being in operation projected through the passage 36 in the finger 35 into engagement with the ribbon 33, so as to move the latter against the strip 20 and said band against the finger or platen 34, whereby an imprint is made in a well understood manner.

In order that the type may be actuated as desired, there is mounted on the arm 10 a lever 58 having a short arm 59 bent to one side and provided with a cam head 60, so positioned that when the lever is rocked in one direction on a pivot pin 61 by means of which it is fastened to the arm 10, the cam block 60 is carried into engagement with the extension 57 of the type member in the path of this block and the type member is moved in the direction of the length of the axis of the stem 53 to cause the type 56 to engage the ribbon and imprint on the paper in the manner described. The lever 58 is constantly urged in a direction to cause the engagement of the cam 60 with the extension 57 of a type by a spring 62, one end of which is connected to the short arm 59 of the lever and the other end to an appropriate portion of the clip 2.

The long arm of the lever extends in what may be termed a downward direction, and its extremity is bent at an angle as indicated at 63, and near the end of this angle extension there is a slot 64 traversed by a bolt 65 constituting a journal support for a roller 66, this roller being designed to engage that portion of the log B to be cut off by the saw C.

The long arm of the lever 58 carries an elongated pawl member 67 having its free end 68 in position to engage the teeth of the ratchet wheel 29 and the end 68 of the pawl, as well as the teeth of the ratchet 29, are so related that a rocking movement of the lever about its pivot 61 will cause a progressive step by step rotation of the ratchet 29. The end 68 of the pawl 67 is set at an angle to the axis of rotation of the pawl and to a plane perpendicular to said axis, so that a movement of the active portion of the end 68 will have a cam effect on the ratchet 29 to cause its rotation the distance of one tooth on the movement of the lever 58 to the proper extent.

The clip 2 has extending therefrom an arm 69 bent into concentric relation to the axis of the ring 6 and journaled in the free end of this arm there is a shaft having at one end a hand wheel 70 and at the other end a bevel pinion 71 formed with teeth, between which the extensions 57 may engage, so that on rotating the hand wheel 70 rotative movement may be imparted to the ring 47 to any desired extent, the extensions 57 acting the same as the teeth of a gear wheel, of which the ring 47 may be considered as the body.

The operator first ascertains the proper data as to the boards to be cut from a certain log, and by a manipulation of the hand wheel 7 first brings the appropriate type into position to be engaged by the cam 60 and to imprint on the paper strip 20. This data is obtained from a sheet 72, a portion of which is shown separately in Fig. 11, and this sheet is, for convenience of inspection and for protection, lodged within a transparent casing 73 carried by a stem which may be lodged in a sleeve 74 carried by the bracket 75 fast to the bar 14, or to any other appropriate portion of the mechanism. The casing 73 is readily rotatable to bring any portion of the sheet 72 into clearly readable position, and this sheet may contain such data as will be helpful to the operator in setting the machine. For instance, in the particular arrangement shown in the portion of the sheet illustrated in Fig. 11, the thickness, width and length of boards is given and the number of board feet agreeable to such sizes, and the sheet may contain all the data desirable.

Let it be assumed that the log B is of some standard length and the timber to be cut therefrom is to be of some standard width and thickness. Merely by way of example let it be assumed that the log to be cut is sixteen feet in length and eighteen inches thick, and that each board is to be cut one inch thick. This will mean twenty-four board feet to each board, and, therefore, the type designed to mark the number twenty-four on the paper strip 20 is brought into position for that purpose. As soon as the log is put into position, the wheel 66 is so related thereto that it will be engaged by the side of the log from which the board is to be cut and the lever 58 is moved into a position which will carry the cam block 60 away from the particular type to be acted upon and stretch the spring 62. The sawing of the log may then proceed and the roller 66 will merely idly rotate. When, however, the end of the log passes beyond the roller 66 the lever 58 is released to the action of the spring 62 and the cam block 60 is brought into engagement with the particular type member moving the latter longitudinally to an extent causing an imprint upon the paper. When the log is returned for a second cut, it is shifted over an appropriate distance and when it engages the roller 66 the lever 58 is again moved into a position carrying the block 60 away from the type member and stretching the spring 62 and this movement causes the pawl end 68 to engage the ratchet wheel 29 to impart thereto a rotative movement which in turn is imparted to the shaft 26, and by way of the gear wheels 25 and 24 to the shaft 17, so that both the ribbon and the paper are wound to an appropriate extent upon the respective drums 28 and 18 and unwound from the corresponding other drums, thus bringing fresh surfaces of both the ribbon and paper into position to cause a new imprint spaced from the first imprint when the log is again passed beyond controlling effect upon the roller 66. This action is continued until the log has been sawed up, although it may be necessary at times to operate the lever 58 by hand for the last one or two boards cut, for which purpose there is provided a handle 58ª on the lever 58. If the next log be of a different length or width, or the board be of a different thickness than the one first cut, the annulus 47 is rotated until the proper type is brought into position, this type being readily ascertained from inspection of the table 72, and the operation is repeated. By reference to the paper strip 20 after the sawing operations have been completed, it becomes an easy matter to count up the number of boards cut and their sizes by board feet or otherwise recorded on the paper strip. The action of the recording mechanism is practically automatic and the record is accurate and without the liability of mistakes when the tallying of the lumber cut depends upon some attendant who may become careless and so fail to give the proper total, either overcounting or under counting.

Should it transpire that the mill is occupied for a considerable period of time, say a day or more, in sawing up logs into boards of the same length, width and thickness, no attention whatsoever is required on the part of the operator, for the actuation of the recorder for the logs when brought into position to be presented to the saw automatically engage the roller 66 and move the lever 58 to substantially the position shown in Figs. 1 and 3, and when the log has passed beyond controlling relation to the roller 66 the parts assume the position shown in Fig. 10 to be again returned to the first position, when the log is once more placed for presentation to the saw to cut the next board, and this may continue indefinitely until the whole number of logs is cut up into boards, when reference to the strip 20 will enable the operator or other authorized person to ascertain the number of board feet or other data for which the recorder is set, produced by the mill.

The recorder is readily raised and lowered, being locked to the post 1 by the lever 3, and it is customary to place the device at the operator's side of the log so as to be within ready reach of the operator should any manipulation be required.

What is claimed is:—

1. A recorder for sawmills having record producing means, record receiving means, and actuating means for said record receiving and record producing means, the said actuating means being movable by passing lumber to cause the actuation of the record receiving means and movable after the passage of the lumber to cause the actuation of the record producing means.

2. A recorder for sawmills having record receiving means, record producing means, the latter including a plurality of imprinting members movable at will to bring any chosen imprinting member into operative position to the exclusion of the others, an actuating means for the record producing means having a range of movement under the action of passing lumber to move the record receiving means to present an unused record surface, and movable on escape from the passing lumber to cause the chosen, positioned one of the imprinting members to engage the record receiving means.

3. A recorder for sawmills having a record receiving means, a record producing means, and a lever having a normal constraint in one direction and adapted to actuate the record receiving means and the record producing means in succession, said lever being also adapted to be engaged by that portion of a log to be severed by the saw of the sawmill when the log is moving into operative relation to the saw, the movement of the lever against its normal constraint causing the actuation of the record receiving means and the movement of the lever under its normal constraint causing the actuation of the record producing means.

4. A recorder for sawmills comprising a suitable frame, a carrier on said frame for a web designed to receive an imprint, inking means also on said frame, imprint producing devices mounted on said frame, and a lever having a normal constraint in one direction and adapted to actuate said imprint producing devices, said lever being also adapted to be engaged by that portion of a log to be severed by the saw of the sawmill when the log is moved into operative relation to the saw.

5. A recorder for sawmills comprising a suitable frame, means thereon for supporting an imprint receiving member, inking means in operative relation to an imprint receiving member when in position on its support, imprinting devices carried by the frame, and a lever carried by the frame and having a normal constraint in one direction, said lever being provided at one end with means for engaging and actuating the imprint producing devices and at the other end with means for engagement of a log therewith when in position to be presented to the saw of the sawmill, the lever then moving in opposition to its normal constraint.

6. A recorder for sawmills comprising a suitable frame, means thereon for supporting an imprint receiving member, inking means in operative relation to an imprint receiving member when in position on its support, imprinting devices carried by the frame, and a lever carried by the frame and having a normal constraint in one direction, said lever being provided at one end with means for engaging and actuating the imprint producing devices and at the other end with means for engagement with a log therewith when in position to be presented to the saw of the sawmill, th lever then moving in opposition to its normal constraint, the lever and inking and imprint supporting devices being provided with co-acting means for actuating said devices to advance the imprint receiving member at each actuation of the lever.

7. In a recorder for sawmills, imprint receiving means, imprint producing means comprising a series of type members movable at will into operative relation to the imprint receiving means, and means adapted to be actuated by a log when in position to be presented to the saw of the sawmill for causing the movement of the imprinting devices into operative relation to the imprint receiving means.

8. A recorder for sawmills having imprint receiving means, a movable series of imprinting devices, each capable of actuation to cause an imprint on the imprint receiving means, means for moving chosen ones of the imprinting devices into operative position, and means responsive to a log being acted upon by the sawmill for actuating the imprinting devices.

9. A recorder for sawmills having imprint receiving means, a rotatable series of individually movable imprinting members, means for moving any one of the imprinting members into operative relation to the imprint receiving means at will, and means responsive to a portion of a log to be severed by the saw of the sawmill for causing the actuation of a chosen imprinting means each time the log is presented to the saw of the sawmill.

10. A recorder for sawmills having imprint receiving means, a rotatable series of individually movable imprinting members, means for moving any one of the imprinting members into operative relation to the imprint receiving means at will, and means responsive to a portion of a log to be severed by the saw of the sawmill for causing the actuation of a chosen imprinting means each time the log is presented to the saw of the sawmill, said means for actuating the imprinting means comprising a lever movable into and out of operative relation to the imprinting means and having one end adapted to be engaged by the log, and a spring constraining the lever in a direction opposite to that in which it is moved by engagement with a log.

11. A recorder for sawmills comprising an imprint receiving means, shifting means for said imprint receiving means, a rotatable series of type members movable into and out of engagement with the imprint receiving means, a lever having at one end means for engaging the type members to move them into active relation to the imprint receiving means and at the other end provided with means for engaging the portion of a log to be severed by the saw of the sawmill, means carried by the lever for producing a step by step actuation of the shifting means for the imprint receiving means, and a spring connected to the lever and constraining it beyond engaging position with the active type member.

12. A recorder for saw mills comprising a support for a band designed to receive an imprint, a support for an inking ribbon, an actuating means for the ribbon and imprint receiving band, a rotatable series of type members each movable in the direction of its length in said support into and out of active engagement with the inking ribbon to produce an imprint upon the imprint receiving band, means for rotating the support to bring any chosen one of the type members into active position, and a lever having one end provided with means for engaging the active type member in one position of the lever and at the other end provided with means for engaging the portion of a log to be severed by the saw of the sawmill, a spring constraining the lever into active relation to the active type member, and yieldable to the action of the log upon the other end of the lever, and means carried by the lever for producing a step by step shift of the record receiving means each time the lever is actuated.

13. In a recorder for sawmills, a type carrier, type members adapted thereto and each comprising a shank or stem, a body portion at one end of said stem, said body portion being adapted to engage the type carrier with the stem extending therethrough, an extension from said body member constituting the imprinting portion of the type, an extension from the end of the stem remote from the body member, and an actuating means for the type adapted to engage the last named end.

14. In a recorder for saw mills, a type carrier, type members adapted thereto and each comprising a shank or stem, a body portion at one end of said stem, said body portion being adapted to engage the type carrier with the stem extending therethrough, an extension from said body member constituting the imprinting portion of the type, an extension from the end of the stem remote from the body member, an actuating means for the type adapted to engage the last named end, and a gear member in position to engage the said last named ends successively to impart motion to the carrier and the type members supported thereon.

15. In a recorder for sawmills, record receiving means, a rotatable carrier, a circular series of type members having printing ends adapted to cause impressions on the imprint receiving devices, each type member being movable in the direction of its length in the carrier and having the end remote from the impression producing means projecting beyond the corresponding face of the carrier, a gear member in position to engage the said projecting ends successively to impart rotative motion to the carrier and type thereon, and means for engaging the said last named ends of chosen ones of the type to move the type in the direction of their length into imprinting engagement with the imprint receiving devices.

16. In a recorder for sawmills, record receiving means, a rotatable carrier, a circular series of type members thereon having printing ends adapted to cause impressions on the imprint receiving devices, each type member being movable in the direction of its length in the carrier and having the end remote from the impression producing end projecting beyond the corresponding face of the carrier, a gear member in position to engage the said projecting ends successively to impart rotative motion to the carrier and type thereon, and means for engaging the said last named ends of chosen ones of the type to move the type in the direction of their length into imprinting engagement with the imprint receiving devices, said type actuating means comprising a lever having at one end a cam block adapted to actuate the type and at the other end means for engaging a log to be moved thereby, said lever having a spring connected thereto for imparting to it a normal tendency to move into engagement with the type.

17. A recorder for sawmills comprising imprint receiving means, a series of impression producing means each different from the others, means responsive to the portion of a log being presented to the saw for causing the actuation of chosen ones of the impression producing means, and readily visible means for indicating the particular impression producing means to be used for lumber of predetermined sizes.

In testimony, that we claim the foregoing as our own, we have hereto affixed our signatures in the presence of two witnesses.

BENJAMIN BARROW SPRATLIN.
JAMES WILL SPRATLIN.

Witnesses:
JAMES C. COILE,
A. P. FORD.